C. W. VAUGHAN.
TRANSMISSION GEARING.
APPLICATION FILED JAN. 2, 1914.
1,183,918.
Patented May 23, 1916.
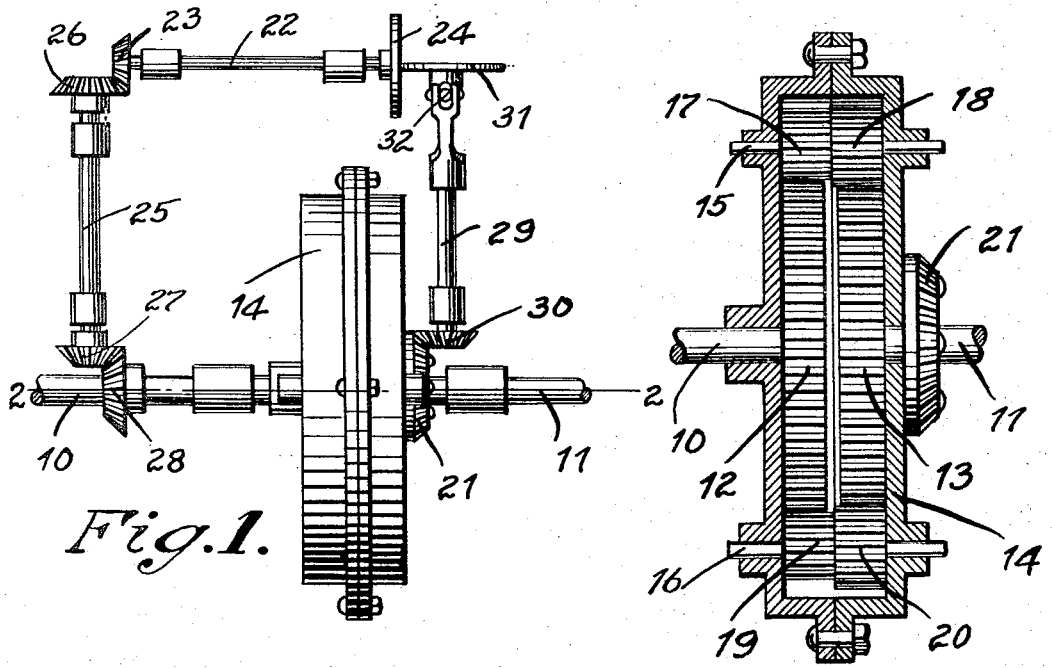
Fig. 1.
Fig. 3.
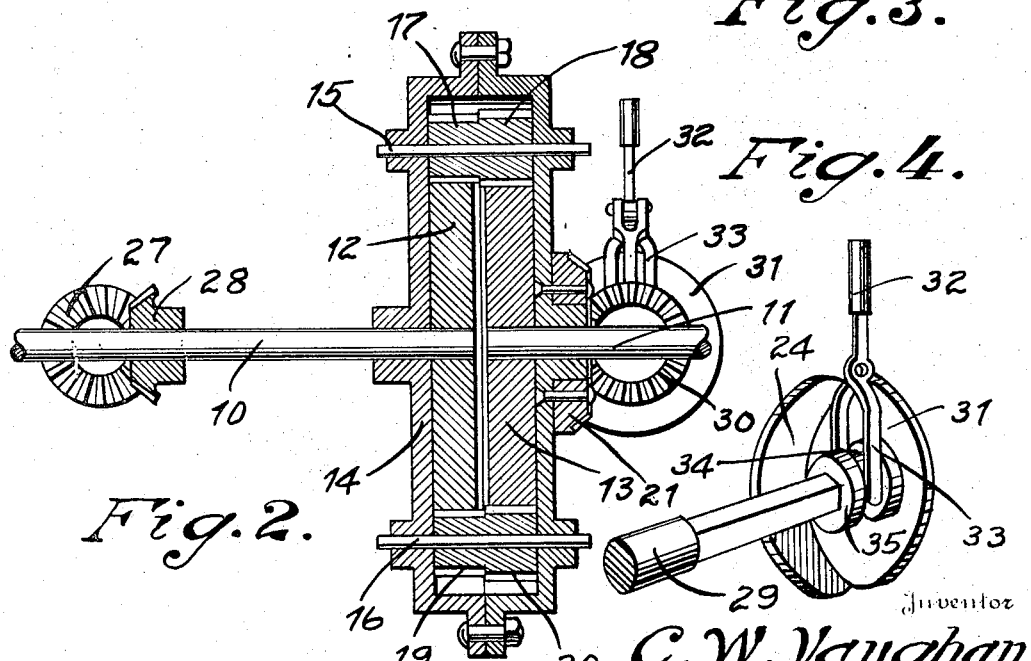
Fig. 2.
Fig. 4.
Witnesses
M. S. Watson
Henry T. Bright
Inventor
C. W. Vaughan
By Chandler & Chandler
Attorneys

UNITED STATES PATENT OFFICE.

CHARLES W. VAUGHAN, OF EUSTIS, FLORIDA.

TRANSMISSION-GEARING.

1,183,918.  Specification of Letters Patent.  Patented May 23, 1916.

Application filed January 2, 1914. Serial No. 809,976.

*To all whom it may concern:*

Be it known that I, CHARLES W. VAUGHAN, a citizen of the United States, residing at Eustis, in the county of Lake, State of Florida, have invented certain new and useful Improvements in Transmission-Gearing; and I do hereby declare the following to be a full, clear, and exact description of the invention, such as will enable others skilled in the art to which it appertains to make and use the same.

This invention relates to transmission gearings.

The object of the invention resides in the provision of a simple and efficient driving mechanism in which the speed of the driven member may be varied at will.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1, is a plan view of a transmission gearing constructed in accordance with the invention; Fig. 2, a section on the line 2—2 of Fig. 1; Fig. 3, a view of a fragment of what is shown in Fig. 2 with the gears contained within the casing shown in elevation, and Fig. 4, a perspective view of a controlling mechanism of the gearing.

Referring to the drawings 10 indicates the drive shaft and 11 the driven shaft of the gearing. These shafts 10 and 11 are rotatably mounted in suitable bearings in longitudinal alinement with each other and having their adjacent ends disposed in spaced relation. Fixed on the adjacent end of the shafts 10 and 11 are gears 12 and 13 respectively, the former being of slightly greater diameter than the latter. Loosely mounted on the adjacent ends of the shafts 10 and 11 and inclosing the gears 12 and 13 is a casing 14.

Rotatably mounted in the sides of the casing 14 at diametrically opposite points and extending across the interior of said casing are shafts 15 and 16. Keyed upon the shaft 15 within the casing 14 is a gear including a minor section 17 and a major section 18, the former meshing with the gear 12 and the latter with the gear 13. Keyed upon the shaft 16 is a gear including a minor section 19 and a major section 20, the former meshing with the gear 12 and the latter with the gear 13. Secured against one side of the casing 14 concentric with the shaft 11 is a beveled gear 21 for a purpose that will presently appear. Journaled in suitable bearings and extending parallel to the shafts 10 and 11 is a supplemental shaft 22 which has fixed on the end thereof adjacent the gear 12 a beveled gear 23 and on the end thereof adjacent the gear 13 a friction disk 24.

Journaled in suitable bearings and extending transversely of the shafts 10 and 22 is a connecting shaft 25 which has fixed on one end thereof a beveled gear 26 meshing with the beveled gear 23 and on its other end a beveled gear 27 meshing with a beveled gear 28 fixed on the drive shaft 10. Journaled in suitable bearings and extending transversely of the shafts 11 and 22 is a controlling shaft 29 which has fixed on one end thereof a beveled gear 30 meshing with the beveled gear 21. Slidably and non-rotatably mounted on the other end of the shaft 29 is a friction disk 31 which coöperates with the friction disk 24. This friction disk 31 is adapted to be moved longitudinally of the shaft 29 and transversely of the disk 24 by means of an operating lever 32 having a yoke terminal 33 engaged in a groove 34 formed on a hub 35 constructed integral with the disk 31.

During the operation of the gearing the speed of rotation of the drive shaft 10 is constant as is likewise the speed of the connecting shaft 25 and the supplemental shaft 22. As the disk 31 is moved toward the center of the disk 24 the speed of rotation of the shaft 29 will diminish. As the disk 31 is moved away from the center of the disk 24 the speed of rotation of the shaft 29 will increase. These variable speeds of the shaft 29 will of course be transmitted to the casing 14 owing to the meshing gears 21 and 30. When the speed of rotation of the casing 14 is increased by this means the speed of rotation of the shaft 11 will be decreased as a result of the ratio of the gears 12, 13, 15, 17, 18, 19 and 20. On the other hand as the speed of rotation of the casing 14 is decreased the speed of rotation of the shaft 11 will approach and exceed the speed of rotation of the shaft 10.

What is claimed is:—

In a variable speed transmission, the combination of a drive shaft and a driven shaft, a gear fixed on said driven shaft, a gear fixed on the drive shaft of greater diameter than the gear on the driven shaft, a casing rotatably mounted on said shafts and inclosing said gears, shafts mounted in the sides of the casing at diametrically opposite points and extending across the interior of said casing, gears fixed on said shafts including major and minor portions meshing respectively with the gears on the driven and drive shafts, a gear fixed on said casing, a countershaft having a gear fixed on one end meshing with the gear on the casing, a friction disk slidably mounted on said countershaft, a second countershaft, a friction disk mounted on the second countershaft and having its face in operative engagement with the periphery of the first friction disk, a gear fixed on the second countershaft, a gear fixed on the drive shaft, a third countershaft, and gears fixed on the third countershaft and meshing respectively with the gear on the drive shaft and with the gear on the second countershaft.

In testimony whereof, I affix my signature, in the presence of two witnesses.

CHARLES W. VAUGHAN.

Witnesses:
H. E. Morse,
N. F. Blackwell.